Jan. 11, 1927.
A. C. PRATT
1,614,206
BEAD CABLE FOR TIRES
Original Filed May 21, 1921    2 Sheets-Sheet 1
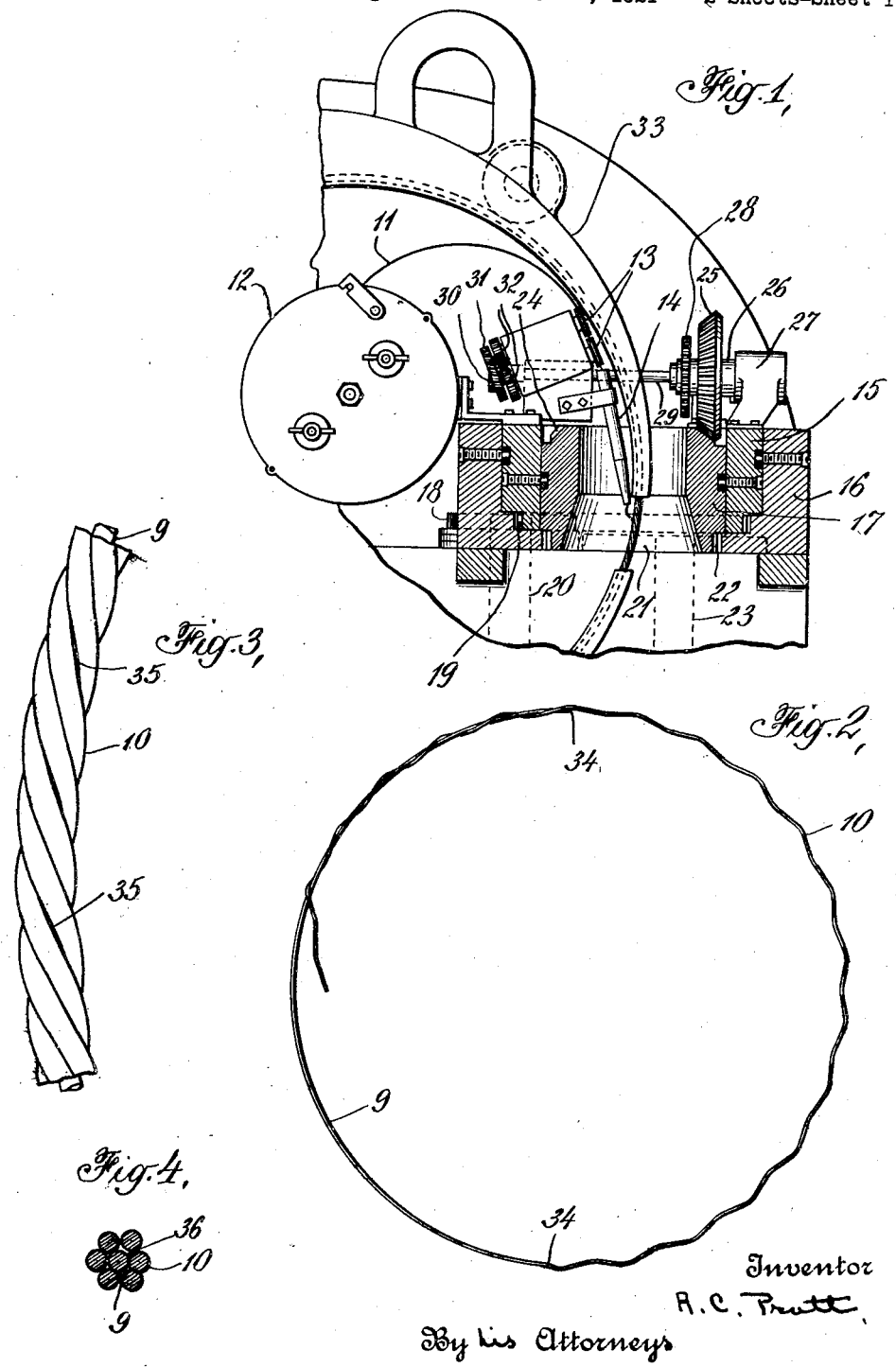

Jan. 11, 1927. 1,614,206
A. C. PRATT
BEAD CABLE FOR TIRES
Original Filed May 21, 1921 2 Sheets-Sheet 2
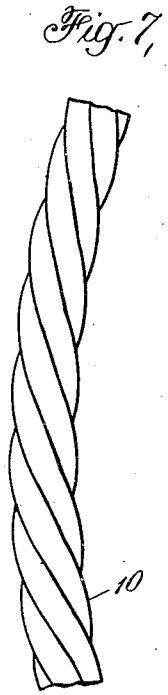
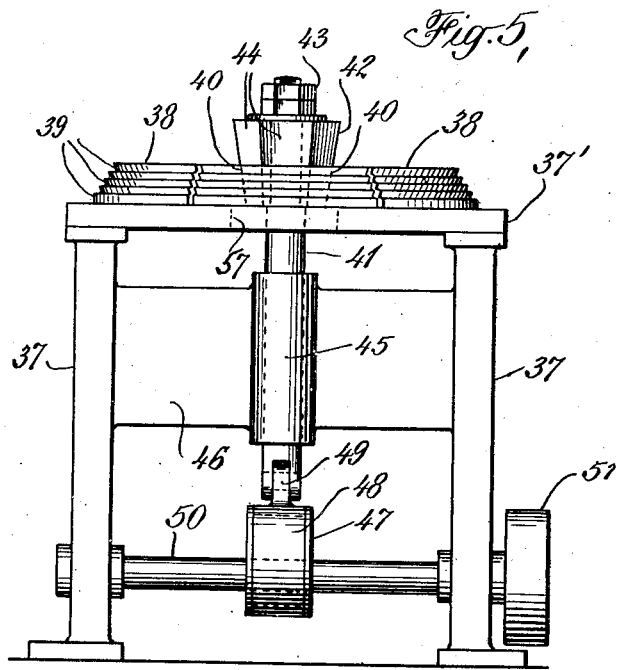
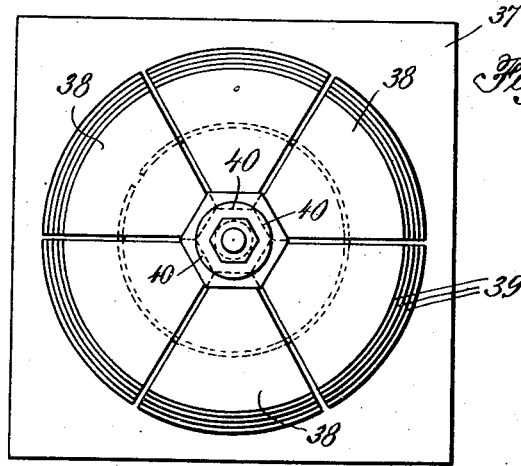

Patented Jan. 11, 1927.

1,614,206

UNITED STATES PATENT OFFICE.

ALPHONSO COMSTOCK PRATT, OF DEEP RIVER, CONNECTICUT, ASSIGNOR, BY MESNE ASSIGNMENTS, TO AMERICAN CHAIN COMPANY, INC., A CORPORATION OF NEW YORK.

BEAD CABLE FOR TIRES.

Application filed May 21, 1921, Serial No. 471,335. Renewed June 10, 1926.

This invention relates to bead cables or gromets for automobile tires adapted to be enclosed within the beads of the casing to reinforce its edge portions.

In the manufacture of tire casings it has been the common practice heretofore to employ bead cables constructed of a single strand of relatively heavy wire bent in the form of a hoop with its ends welded together. Also much lighter wire, as for instance, piano wire, has been used to form a hoop consisting of a plurality of convolutions of straight wire with its ends welded together, several of such hoops oftentimes being laid side by side to make a single bead cable which, whether comprising one or more such hoops, then consists of a multiplicity of strands of straight fine wire.

Bead cables of such construction have been used in practice to a considerable extent, but they have not proven entirely satisfactory for the reason, among others, that they do not possess the uniformly great strength so essential in a cable for the reinforcement of the beads of a casing, due to the welding of the ends of the wire. Hence, any cable so constructed that reliance must be placed on a welded joint would not possess the strength, uniformity, and reliability requisite for use as a bead cable.

The present invention involves the provision of a bead cable constructed from a single piece of wire which is arranged in the form of a plurality of strands or convolutions, the completed cable being without a welded joint. Such a cable possesses great strength and may be manufactured in quantity, at relatively low cost and with marked uniformity in the product.

The bead cable constructed in accordance with the present invention consists of a core and a plurality of convolutions of spirals lying side by side upon the core, the casing and the core being formed from a single continuous piece of wire. In order that the cable may possess greater strength, it is constructed so that all of the convolutions of the casing are in contact with the core at every point along the spiral lines of contact between the casing and the core throughout the circumference of the cable, and each of the convolutions of the casing is in contact with the adjacent convolutions at every point along the lines of contact one with another throughout the circumference of the cable. Where the cable is so constructed, it is free throughout from interruptions of contact between adjacent strands of wire, and the cable is therefore a compact structure of maximum strength inasmuch as it cannot yield under a bursting stress except by elongation or rupture of the wire.

Preferably the bead cable is formed from a single continuous piece of wire and consists of a plurality of convolutions of spirals lying side by side forming a casing and a core enclosed within the casing and formed from the end portions of the piece of wire. The cable is constructed so that each of the convolutions of the casing is in contact with two adjacent convolutions and with the core at every point along the lines of contact one with another throughout the circumference of the cable.

Bead cables of this general type have heretofore been proposed and actually made by hand in a form approximating the cable constituting the present invention. Such cables did not go into commercial use, mainly on account of the fact that the cost of making them was prohibitively high, but their failure was also due in part to their not being perfected to such an extent as to adapt them for use in the manufacture of automobile tires.

Bead cables of the type of the present invention may be manufactured by automatic or semi-automatic machinery at a cost which compares favorably with the cost of the various forms of bead cables heretofore largely used, as, for instance, by employing a method of making bead cables and a machine for carrying out the method, such as are described in Letters Patent No. 1,294,160, granted to me February 11, 1919, and in application for Letters Patent of the United States filed by me on November 6, 1919, and Serially Numbered 336,115.

Whether constructed by hand or by machine, the bead cable thus produced will not, without further procedure, be of the highest strength which it can be made to attain due to interruptions in contact between adjacent strands of wire, as above pointed out, resulting from inaccuracies in manufacture. Such interruptions in contact, or air spaces, may be eliminated by placing the bead cable upon an expanding machine and subjecting it to outward pressure at all points throughout its circumference. When the cable is so subjected to pressure it is expanded slightly but measurably This expansion serves to take up all spaces between the convolutions of the casing, or these convolutions and the core, or both, due to interruptions in contact between them, so that all of the casing convolutions will lie side by side, and upon the core, contacting at every point throughout their entire length. The bead cable so finished will be a compact body of wires wholly without weakening air spaces and incapable of yielding to a bursting stress in any other way than by elongation or rupture of the wire itself, and the cable will thus be of the highest attainable strength.

The invention will be better understood by reference to the following description in connection with the accompanying drawings in which, Figure 1 is a view partly in plan and partly in section illustrating a part of the machine shown and described in my aforesaid application, Serial No. 336,115, and by which the bead cable may be produced;

Fig. 2 is a view in elevation of a bead cable partly constructed;

Fig. 3 is an enlarged view of a section of the cable produced by the machine;

Fig. 4 is a cross-sectional view of the cable illustrated in Fig. 3;

Fig. 5 is a view in elevation of an expanding machine for completing the cable;

Fig. 6 is a top plan view of the expanding machine illustrated in Fig. 5;

Fig. 7 is an enlarged view of a section of the completed cable; and

Fig. 8 is a cross-sectional view of the cable illustrated in Fig. 7.

Referring first to Figs. 2, 3, 4, 7 and 8, the cable constituting the present invention consists of a core 9, and a plurality of convolutions of spirals forming a casing 10 about this core. Preferably the casing consists of six convolutions of spirals of wire of the same size as that used in the core, the six casing convolutions lying side by side around the core. The casing and core are formed from a single continuous piece of wire, the portions of this piece of wire intermediate its ends forming the casing, and the ends of the wire projecting within the casing to form the core. When a bursting stress is imposed upon a cable of this construction the convolutions of spirals are caused to grip the core with increasingly greater force so that it is unnecessary to join the ends of the core. As a result, the cable possesses great strength since no dependence is placed upon welded or other joints in the wire.

A cable of this type is preferably made in accordance with the method and by means of the apparatus described in my aforesaid Letters Patent No. 1,294,160, and in my aforesaid application No. 336,115, wherein the cable is made by preforming the wire, i. e., giving the wire a spiral configuration before applying it to the cable being made Fig. 1 shows a portion of the machine fo making bead cables illustrated and describe in my application for Letters Patent specified, to which reference may be had for a full description of the parts of the machine, its operation and the method of making a bead cable. Fig. 1, illustrating a portion of the machine, and Fig. 2, a partly constructed cable, will serve to illustrate the first steps in the production of a bead cable such as is shown in part in Fig. 3, and in cross-section in Fig. 4.

Referring to Fig. 1 the cable is made from wire 11 drawn from a supply reel 12 by feed rollers 13, which then feed the wire through a die or quill 14 having a spiral passage therethrough (not shown). The entire wire feed mechanism and the die 14 are supported on an outer shuttle 15 mounted to rotate within a bearing block 16. Mounted to rotate within the outer shuttle 15 is an inner shuttle 17. The outer shuttle is driven by a pinion 18 in mesh with gear teeth 19 at one end of the shuttle, the pinion 18 being mounted on a shaft 20 connected to power. The inner shuttle is driven by a pinion 21 in mesh with gear teeth 22 at one end of this shuttle, and the pinion 21 is mounted on a shaft 23 connected to power. The opposite end of the inner shuttle has gear teeth 24 which are in mesh with a bevel gear 25, carried by a shaft 26 that is journaled in a bearing 27 secured to the outer shuttle. At the end of shaft 26 is a spur gear 28. This spur gear is in mesh with a similar gear located directly beneath it and which is carried by a shaft 29. At the end of the shaft 29 is a gear 30 in engagement with a similar gear 31 above it, and the latter actuates the gearing 32 which in turn rotates the feed rollers 13. The gearing for driving the inner and outer shuttles is so arranged that the inner shuttle is rotated relatively to the outer shuttle and at about twice the speed of the latter. As the outer shuttle rotates with the inner shuttle, the wire feed mechanism and the die 14 connected thereto revolve about the cable being formed, and the rotation of the inner shuttle relative to the outer shuttle causes the gear 25 to be actuated thereby through gear teeth 24. Thus while both shuttles rotate the wire feed mechanism is operated to force wire through the die 14, which issues therefrom in the form of spiral wire, and these spirals are laid side by side in succession as the die revolves about the cable to form the casing. At the beginning of the operation of forming a cable, a piece of straight wire is first fed into the support 33 and this wire is of a length a half or a little more than half the circumference of the cable as indicated to the left of 34—34, Fig. 2. This forms part of the core of the completed cable. Following this length of straight wire, the wire is spiraled, as indicated to the right of 34—34, Fig. 2, and, after the convolutions of spirals have been laid side by side to complete the casing, another piece of straight wire of a length to complete the core is provided. The straight pieces of wire forming the core, provided at the beginning and at the end of the operation of forming the cable, are caused to issue from the spiral die 14 without any interruption in the operation of the machine and construction of the cable simply by discontinuing the rotation of the outer shuttle 15, while rotation of the inner shuttle is continued. Under these conditions the rotation of the inner shuttle continues the operation of the wire feed mechanism, the feed of wire through the die 14 proceeds uninterruptedly, and the wire issues from the die as straight wire.

The cable illustrated in Figs. 3 and 4, produced, for example, in accordance with the method and machine described in the foregoing, is not of the greatest attainable strength due to interruptions in contact between the convolutions of the casing, or air spaces, as illustrated at 35 in Fig. 3, or to interruptions in contact or air spaces between the convolutions of the casing and the core 9, as at 36 in Fig. 4, or both. It is of the utmost importance that the convolutions of the casing shall be in unbroken contact with one another and with the core throughout their length so that the completed cable is incapable of yielding to a bursting stress in any other way than by elongation or by rupture of the wire. For, if the cable will yield to a bursting stress, though but a small amount, otherwise than by elongation or rupture of the wire, its strength is accordingly impaired, and its value as a reinforcement for straight side automobile tire casings consequently considerably lessened.

When, therefore, the production of the cable illustrated in Figs. 3 and 4 has been completed, the cable is subjected to an additional operation to take up any air spaces therein to insure unbroken contact between the convolutions of the casing, and the casing and the core. This operation consists in placing the cable upon an expanding machine which may be any well known commercial machine for exerting an outward expanding pressure. For this purpose the machine illustrated in Figs. 5 and 6 is preferably employed. This machine has a table 37' supported on standards 37. The table 37' supports a plurality of segments 38, the outer peripheral surface of each of which is stepped to form a series of surfaces 39 of increasing radius from the top to the bottom of the segments, and the inner surfaces 40 of which are tapered. Mounted on the end of a plunger 41, passing through the table 37' is a wedge block 42, secured to the plunger by means of lock nuts 43. The wedge block 42 has tapering faces 44 corresponding in number to the number of segments, which faces are adapted to engage the inner surfaces 40 of the segments 38. The plunger 41 passes through a guide 45 supported by the frame 46 between the standards 37. The plunger is reciprocated by an eccentric 47 and strap 48 which is connected to the plunger by means of a pin as at 49. The eccentric 47 is mounted on a power shaft 50 having a pulley 51 which may be connected to any suitable source of power. The bead cable to be expanded is placed over the segments 38 and will take a position along one of the surfaces 39 according to its size. The plunger 41 is then moved downwardly from the position indicated in Fig. 5 by means of the eccentric and strap 47—48. The faces 44 of the wedge block being in engagement with the surfaces 40 of the segments 38, the latter are forced outwardly an amount corresponding to the downward movement of the wedge block 42, the table 37' having an opening 57 therein to allow for the passage of the wedge block. The bead cable or gromet is thus subjected to an outward expanding pressure which is made sufficient to take up such air spaces as may exist between the convolutions of the casing, or between the casing and the core, or both.

I claim—

1. A bead cable consisting of a core formed from the end portions of a piece of wire, and a casing formed from the middle portion of this piece of wire and consisting of a plurality of convolutions of spirals lying side by side about the core, and all of the convolutions of the casing being in contact with the core at every point along the spiral lines of contact therewith throughout the circumference of the cable.

2. A bead cable consisting of a core formed from the end portions of a piece of wire, and a casing formed from the middle portion of this piece of wire and consisting of a plurality of convolutions of spirals lying side by side about the core, and the convolutions of the casing each being in contact with adjacent convolutions and with the core at every point along the lines of contact one with another throughout the circumference of the cable.

3. A bead cable made from a single continuous piece of wire and consisting of a plurality of convolutions of spirals formed from the middle portion of a piece of wire and lying side by side to form a casing, and a core enclosed within the casing and formed from the end portions of the piece of wire, the convolutions of the casing each being in contact with two adjacent convolutions and with the core at every point along the lines of contact one with another throughout the circumference of the cable.

In testimony whereof I affix my signature.

ALPHONSO COMSTOCK PRATT.